July 19, 1938.  J. McARTHUR  2,123,951
FISH LURE
Original Filed May 1, 1936
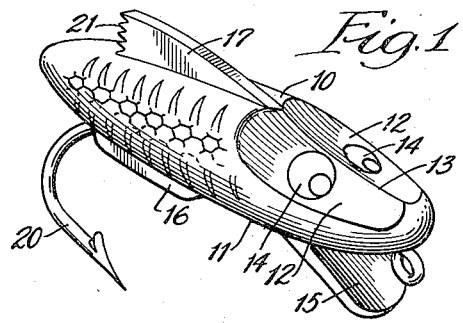
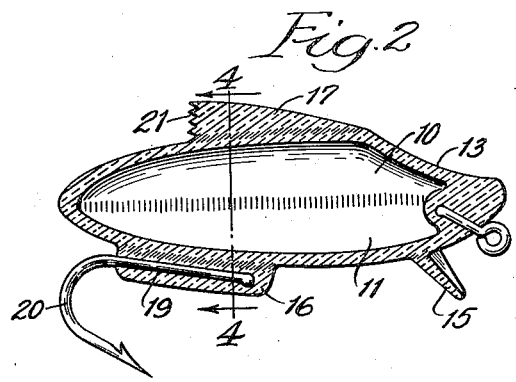
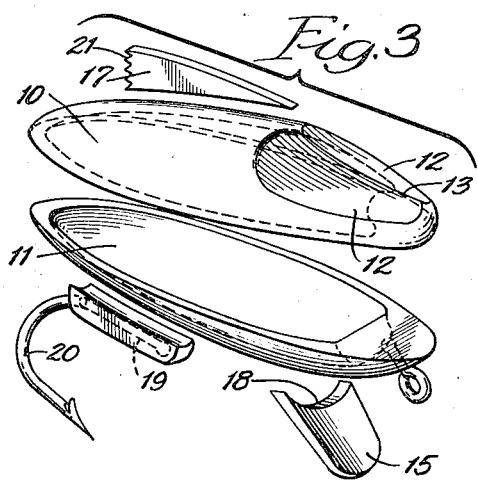
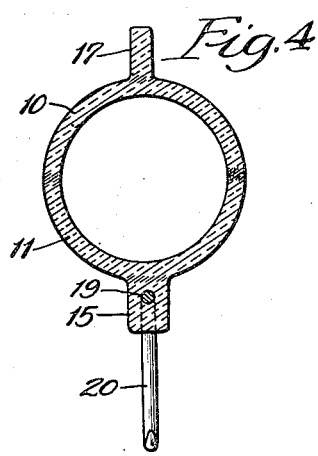
Inventor:
Joseph McArthur,
By Banning & Banning
Attorneys.

Patented July 19, 1938

2,123,951

UNITED STATES PATENT OFFICE 2,123,951

FISH LURE

Joseph McArthur, Dowagiac, Mich., assignor to James Heddon's Sons, Dowagiac, Mich., a corporation of Michigan Original application May 1, 1936, Serial No. 77,369, now Patent No. 2,106,755, dated February 1, 1938. Divided and this application July 31, 1937, Serial No. 156,790

1 Claim. (Cl. 43—46)

This application is a division of application Serial No. 77,369, filed May 1, 1936 now Patent No. 2,106,755 of Feb. 1, 1938.

The lure of the present invention in the form shown is designed primarily, though not exclusively, to serve as a casting lure for bass in lieu of a fly, bug, or similar small and light bait of the type commonly employed with a fly rod, although the features hereinafter described are adapted for use in plugs or other lures of larger and heavier characters than casting lures of the kind illustrated.

The invention relates in particular to a lure which is preferably made in sections from a composition of non-buoyant material, such as pyralin or the like, which sections are united together by coalescence in such a way as to seal the interior and thus provide a buoyant bait which may be and thus finished or otherwise decorated to simulate scale a bug or small minnow. Certain of the features, however, are adapted for use in the formation of a solid bait or a hollow bait of non-sectional character, so that it will be understood that the bait here shown serves merely to illustrate the invention in one of its possible embodiments.

The invention also relates to uniting and sealing of the sections in such a way as to cause the composition to coalesce at the joints and thus provide a smooth and unbroken surface impervious to the ingress of water, and to the provision made for the attachment of a collar, lip, or other protuberant fitting of the kind required to finish the bait in the intended manner, and to afford reinforcement for the attachment of the hook or hooks.

Further objects and details will appear from the description of the invention in conjunction with the accompanying drawing, wherein,—

Figure 1 is a perspective view of the bait showing the protuberant features which more particularly form the subject of the present invention;

Fig. 2 is a longitudinal section taken through the bait body;

Fig. 3 is a perspective view of the individual parts in separated relation before the same have been united by coalescence to form the complete bait; and Fig. 4 is a cross sectional elevation taken on line 4—4 of Fig. 2.

The body is roughly of cigar-shape, and as shown comprises an upper section 10 and a lower section 11, although the features of the present invention are applicable to a solid bait body formed of composition, or to a hollow body in which the sections are otherwise formed.

The sections are formed of suitable composition of cellulosic material which is adapted, when treated with a proper solvent, to soften, so that when the meeting edges of the sections thus softened are pressed together a coalescence will occur, thereby integrally uniting the sections along the line of juncture, which affords a sealed chamber on the interior of the bait body.

As shown, the front end of the bait body is provided with flattened or slightly dished and obliquely extending surfaces 12 which unite in a ridge 13 which afford surfaces for the painting of the eyes 14 to give the appearance of the head of a small minnow. The exterior of the bait body may be painted, if desired, to give the intended coloration and finish.

The exterior protuberant portions of the bait, in the present instance, include a lip 15, a lower rib 16, and a dorsal fin 17. These protuberant portions are all formed of a like composition, and are united by coalescence to the exterior of the body by the use of a solvent, so that, when thus united, the protuberant portions will in effect be integrally united with the bait body by an indiscernible line of juncture, so that the use of metallic attachments, of the character usually employed for a like purpose, is obviated, which adds to the lifelike appearance of the bait, insures against displacement of the parts, and obviates the necessity for the use of screws or similar fittings which are likely to be pulled out or displaced, especially when entered into the relatively thin walls of a hollow bait. Furthermore, by molding or otherwise forming the protuberant portions of composition, and by uniting them to the body in the manner stated, the labor required and the expense of manufacture will be reduced to a minimum.

The lip 15, as shown, is of dished formation on its forward surface, and is provided at its upper end with a curving thickened edge 18 which fits snugly against the under side of the bait body below the head portion in such a way as to cause the lip to extend obliquely forward in order to provide a resistance element adapted to impinge against the water and cause diving or darting movements as the bait is drawn through the water. The rib 16 is secured to the under side of the body at or near the rear end thereof and has the shank 19 of a hook 20 embedded within the rib, so that when the rib is united to the body by coalescence the hook will be firmly anchored to the body in such a way as to prevent withdrawal, since the rib affords a sufficient area of union with the body to prevent displacement, and likewise affords a sufficient thickening of the body wall at this point to provide the necessary anchorage for the hook. The dorsal fin 17 is of elongated tapered formation, and its rear terminus 21, as shown, is serrated to more closely imitate the dorsal fin of a minnow.

Although the protuberant portions are in the form shown and described, it will be understood that variations in the shape and location of these or similar protuberant features are permissible, since the basic idea involved is that of forming those protuberant extensions of composition of similar or identical character with that of the body, so that such accessory features may be united to the body by coalescence, thereby permitting such features to be molded and configured in a more lifelike form than is ordinarily possible where metallic fittings are employed and screws or the like are used to secure the parts together.

The finished bait, although made of non-buoyant material, provides a buoyant bait by reason of the sealing of the sections together and the provision of an air chamber within, although it will be understood that a solid bait body of non-buoyant composition may be employed, since the present invention relates primarily to the attachment of the protuberant accessory features to the bait body by coalescence rather than to the interior construction of the body itself. By making the bait of a suitable composition rather than of wood or the like, a hard smooth surface is provided as a base for the colors employed in finishing the bait, and no cracking or chipping or chafing will occur when the bait is subjected to actual use. It will be understood, however, that it is not the intention to limit the invention to a bait employing a surface finish, since the composition itself may afford the necessary coloration.

Where a union of the parts by coalescence is referred to, I mean to imply that the portions thus united are either of identical material or of materials which, even if chemically distinguishable, are so closely allied in composition that they will unite by coalescence into a mass which is actually or substantially integral as distinguished from a union effected by an interposed adherent or the like, and I do not intend that the term "same composition" shall exclude variations from exact similitude which in no material degree affect or impair their capacity to unite in the manner stated.

It will also be understood that by "protuberant portions" I have reference to any part or portion of the completed bait which protrudes or extends substantially beyond the normal surface plane of the bait body.

I claim:

A fish bait consisting of a body formed of composition and a preformed protuberant portion of the same composition united to the body by coalescence and extending outwardly from the plane of the body, said protuberant portion being in the form of a rib depending from the under side of the body, and a hook having its shank imbedded within said rib and having its barbed end protruding rearwardly therefrom.

JOSEPH McARTHUR.